Figure 1:
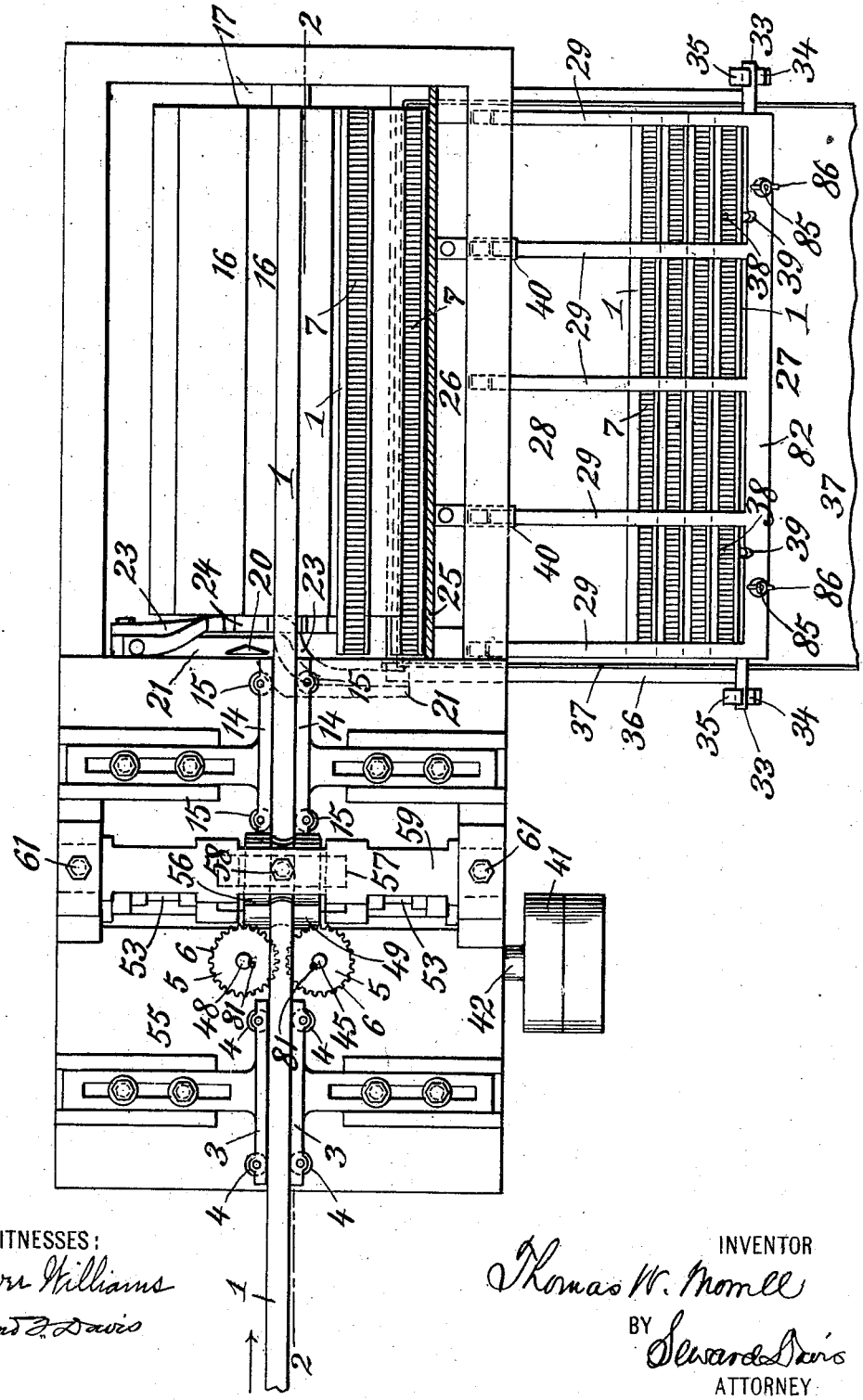

No. 889,479. PATENTED JUNE 2, 1908.
T. W. MORRELL.
MACHINE FOR PRODUCING CAMES.
APPLICATION FILED APR. 8, 1907.

4 SHEETS—SHEET 1.

WITNESSES:
Oliver Williams
Edmund T. Davis

INVENTOR
Thomas W. Morrell
BY
Seward Davis
ATTORNEY

No. 889,479. PATENTED JUNE 2, 1908.
T. W. MORRELL.
MACHINE FOR PRODUCING CAMES.
APPLICATION FILED APR. 8, 1907.
4 SHEETS—SHEET 2.
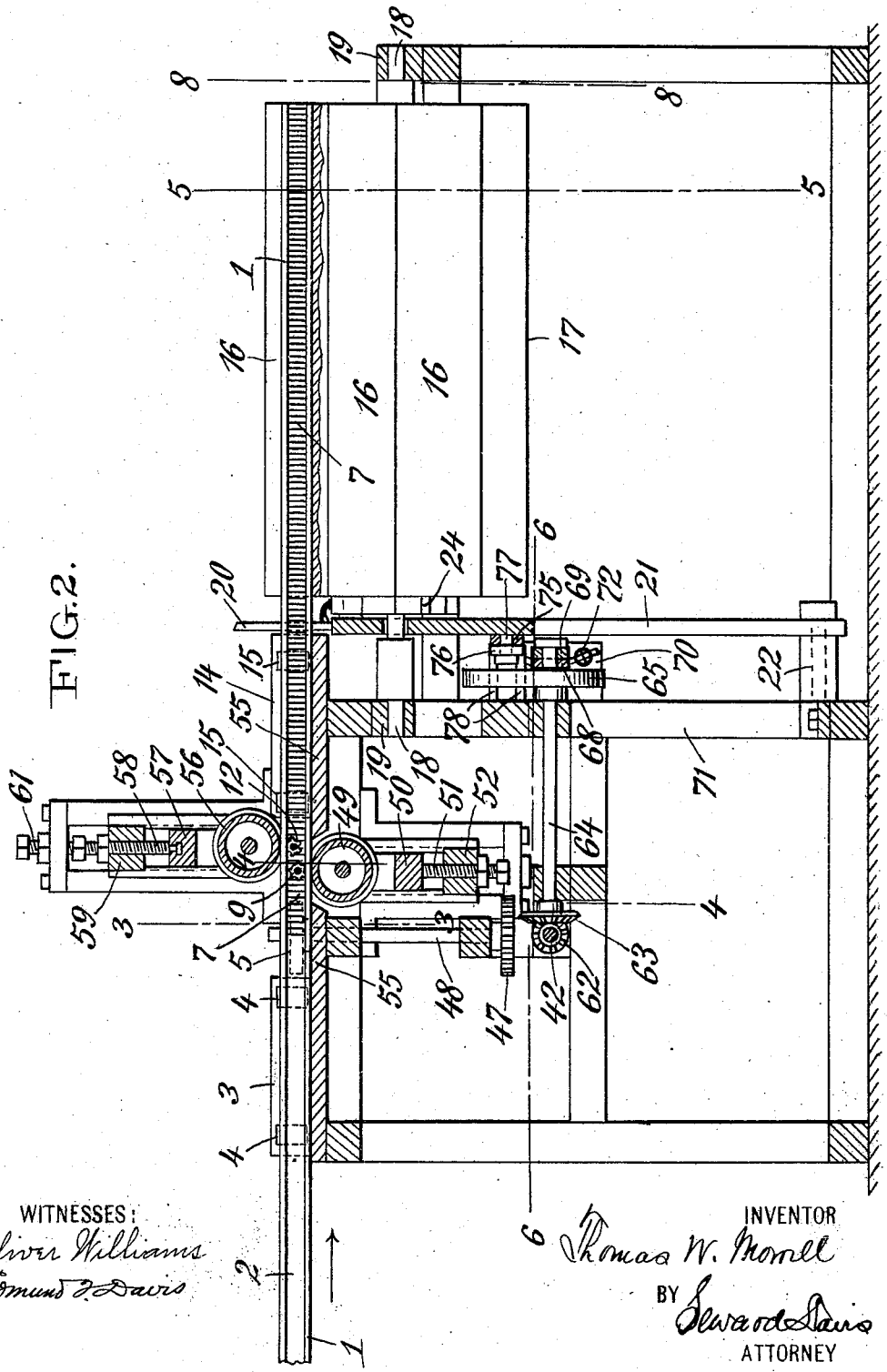
WITNESSES:
Oliver Williams
Edmund F. Davis
INVENTOR
Thomas W. Morrell
BY Edward Davis
ATTORNEY

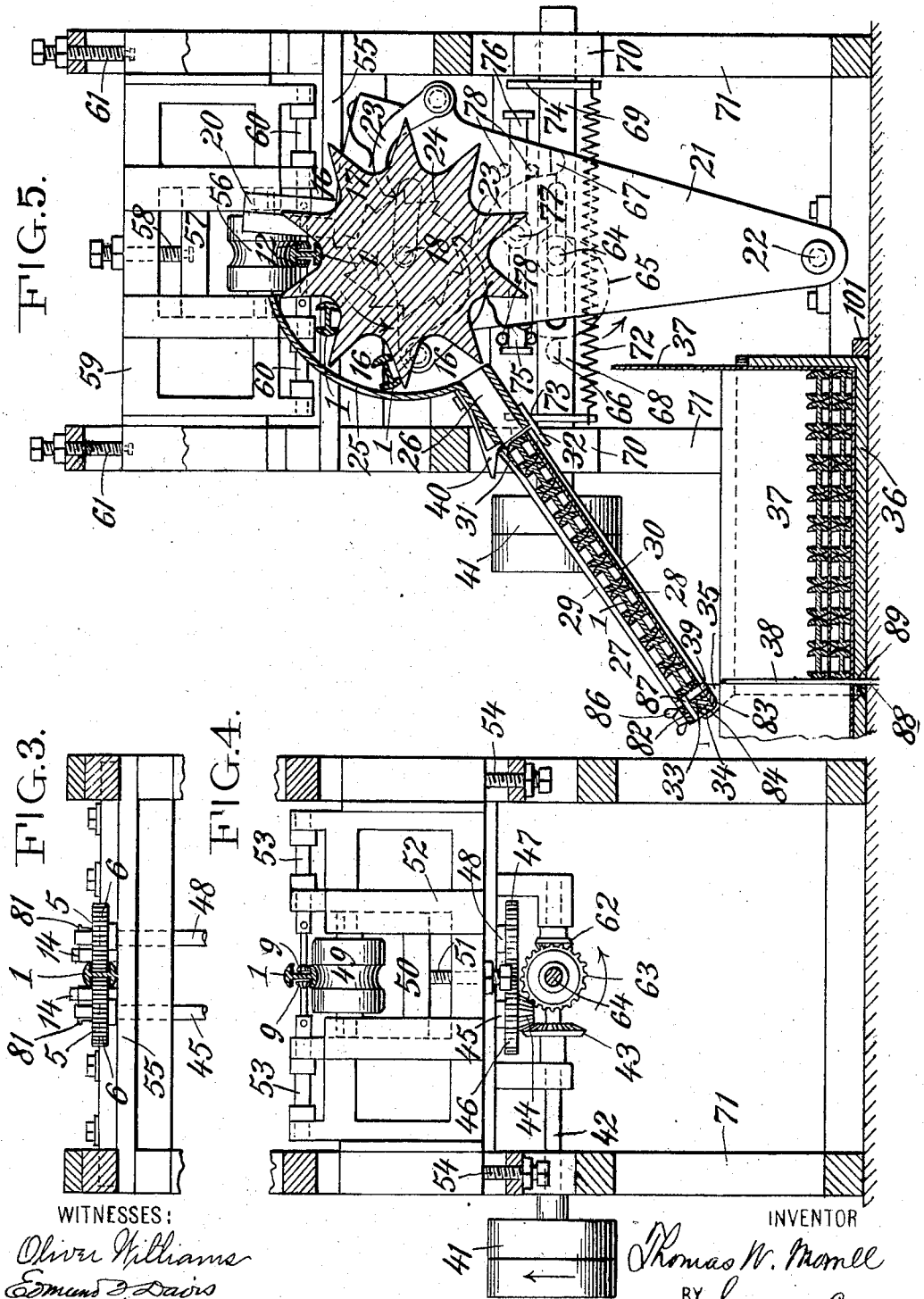

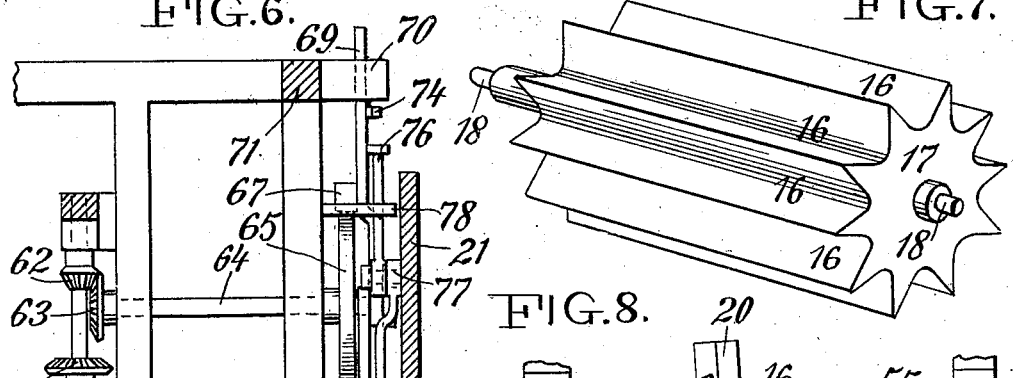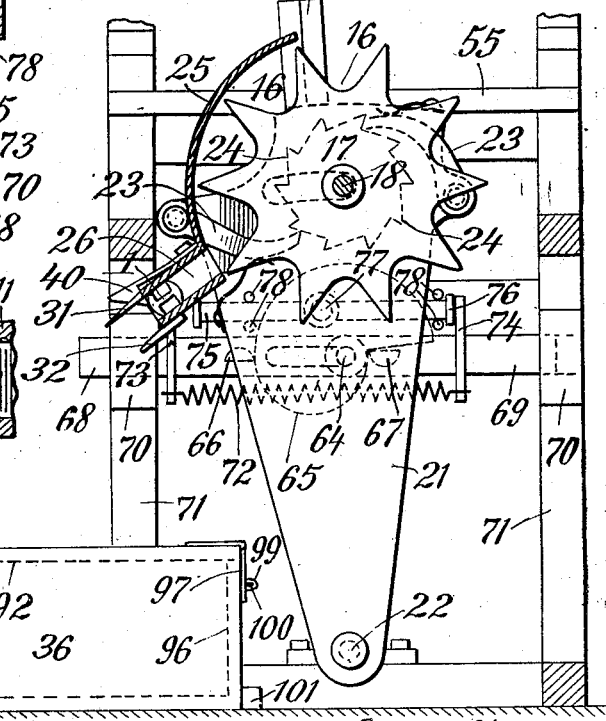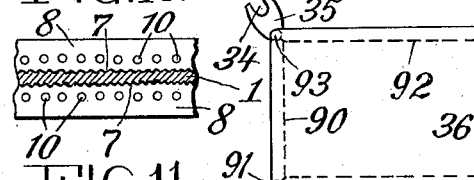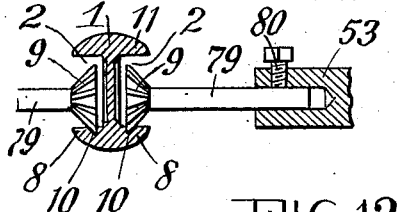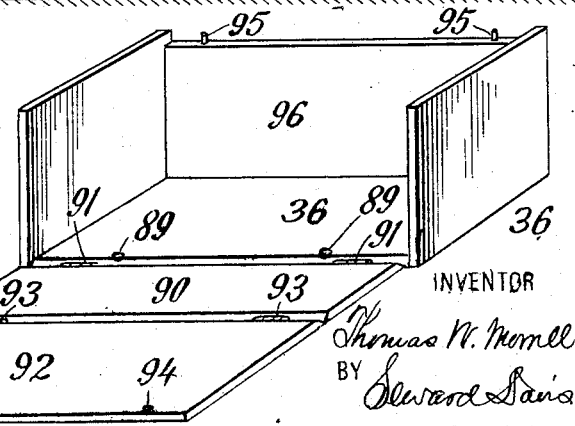

UNITED STATES PATENT OFFICE.

THOMAS W. MORRELL, OF BLOOMFIELD, NEW JERSEY.

MACHINE FOR PRODUCING CAMES.

No. 889,479.   Specification of Letters Patent.   Patented June 2, 1908.

Application filed April 8, 1907. Serial No. 367,121.

*To all whom it may concern:*

Be it known that I, THOMAS W. MORRELL, a citizen of the United States, residing in the town of Bloomfield, county of Essex, and State of New Jersey, have invented certain new and useful Improvements in Machines for Producing Cames, of which the following is a specification.

My invention has for its object the provision of a machine for operating in a continuous manner upon an endless strip of metal of suitable cross section for the production of cames, and particularly the production of an improved came which is not claimed herein, but which forms the subject matter of an application filed by me on the 11th day of March, 1907, Serial Number 361,804 and in which the operations of indenting the web and flanges of the strip may be carried out very expeditiously.

Reference is hereby made to the accompanying drawing of which

Figure 1 is a plan view of a machine constructed in accordance with my invention.
Fig. 2 is a section on line 2—2 of Fig. 1. Fig. 3 is a section on line 3—3 of Fig. 2. Fig. 4 is a section on line 4—4 of Fig. 2. Fig. 5 is a section on line 5—5 of Fig. 2. Fig. 6 is a section on line 6—6 of Fig. 2. Fig. 7 is a perspective view of the carrier for conveying the finished cames. Fig. 8 is a section on line 8—8 of Fig. 2. Fig. 9 is a detail sectional view of a portion of the traveling came strip showing the rolls for indenting the flanges thereof. Fig. 10 is a sectional plan view of a portion of one of the finished cames showing the indentations thereof. Fig. 11 is a section on line 11—11 of Fig. 9. Fig. 12 is a perspective view of the receptacle into which the finished cames are to be packed.

Referring to Figs. 1 and 2, the endless strip 1 from which the cames are formed travels from left to right, this strip being in the form of a double channel or I having a vertical web and top and bottom flanges on either side thereof. This strip occupies a horizontal position resting upon the supporting table or bed 55 and between the oppositely disposed rollers 4, 4 carried by the laterally adjustable guides 3, 3 and similar pairs of rollers 15, 15 carried by the similarly adjustable guides 14, 14. Between the two sets of guides referred to is a pair of fluted rolls 5, 5 mounted upon vertical spindles 45 and 48 suitably journaled in the main frame 71. These rolls are of such size that the teeth formed upon their peripheries indent the vertical web of the came strip as it passes between them, and as these rolls are positively driven by a mechanism which will be described later, they serve to feed the strip forward through the apparatus. The rolls 5 are secured upon the upper ends of the spindles 45 and 48 by keys 81, so that they may be readily removed and replaced by rolls of different size whenever it is desired to operate upon strips of different thickness.

After leaving the fluted rolls 5, the traveling strip passes between a grooved supporting roller 49 adapted to fit the rounded surface of the strip as shown in Fig. 4 and a pair of oppositely disposed fluted rolls 9, 9 which are mounted upon the ends of arbors 79, the latter being removably secured in sockets formed in the ends of the spindles 53 by set screws 80, (see Fig. 11). These rolls 9 are adapted to form indentations in the bottom flanges 8 of the traveling strip 1, the roller 49 acting as a support to coöperate with the fluted rolls in the formation of said indentations and the apparatus is designed to operate upon came strips whose flanges are of different thickness to produce indentations of any desired depth by means of an adjustment of the roller 49 and spindles 53 shown most clearly in Fig. 4. The spindles 53 are journaled in a frame 52, the ends of which engage vertical guides in the main frame 71 and may be adjusted vertically by means of adjusting screws 54. The roller 49 is supported by a frame 50 which moves in vertical guides formed in the frame 52 and is vertically adjusted by the adjusting screw 51.

The traveling strip 1 next passes between the fluted rolls 12, 12 and the grooved roller 56 (Fig. 5) which parts serve to form indentations in the upper flanges of the strip in a manner exactly similar to that by which the indentations are formed in the lower flanges as has been described. The arbors of the rolls 12 are removably held in sockets in the spindles 60 and the latter are journaled in the frame 59 which moves in vertical guides in the main frame 71 and is adjusted vertically by means of adjusting screws 61; the roller 56 is journaled in the frame 57 which moves in vertical guides in the frame 59 and is held in various positions of vertical adjustment by the adjusting screw 58.

The traveling strip 1 having passed the three sets of indenting rolls and the lateral guide rollers 15, reaches the end of the table 55 and passes thence into one of the grooves 16 of the rotary carrier 17. When it reaches the end thereof it is severed by a quick movement of the knife 20 which is double edged and cuts first in one direction and then the other, moving with a quick powerful action produced by mechanism which will be afterwards described, the said mechanism however being so correlated with the feed rolls 5 as to cut off from the endless strip sections of uniform length. That portion of the moving strip which is thus severed at this moment occupies the groove 16 formed in the periphery of the revolving drum or conveyer 17, and this conveyer is a periodically rotating member which serves to convey the cut lengths in a direction transverse to that in which the endless strip travels, the cut lengths being therefore continuously conveyed to one side as shown in Fig. 5, being prevented from leaving the groove 16 by a curved guard 25 until the chute 26 at the lower edge of said guard is reached, said chute being preferably integral with the guard as illustrated. Upon reaching the said chute the weight of the came causes it to enter the chute as shown in Fig. 8. In this view the came is shown as being held by a shoulder upon a spring member 40 of which there are a number at regular intervals along the width of the chute (see Fig. 1).

A removable chute 27 is adapted to be applied to the fixed chute 26 so as to receive a limited number of the finished cames from the said chute. The removable chute is preferably constructed as follows: A series of upper strips 29 and lower strips 30 spaced laterally, are secured at one end to a cross bar 84 by means of bolts 85 and thumb nuts 86. The distance between the two sets of strips may be varied by the use of one or more washers 87, to adapt the chute to cames of different sizes. The strips 30 are preferably covered with a sheet of moisture proof paper or other packing, such as wax or paraffin paper and serve as a sloping table to receive and support the cut cames. Upon the ends of the cross bar 84 are pintles 33 and which are adapted to rest in sockets 34 mounted on standards 35 while the free ends of the strips 30 rest upon fingers 32 carried by the fixed chute 26, and when the removable chute occupies this position the ends of the strips 29 force the springs 40 upward as shown in Fig. 5 so as to permit the cames to slide freely from the chute 26 into the chute 27.

The mechanism for operating the various moving parts is as follows: Power is applied to the drive pulley 41 on the end of the shaft 42, Figs. 1, 4 and 6. This shaft is suitably journaled in bearings carried by the main frame 71 and is provided with bevel gears 43 and 62. The gear 43 drives the bevel gear 44 which is rigid with the spur gear 46 mounted on the lower end of the vertical shaft 45 which carries the fluted roll 5 and is journaled in the main frame. Meshing with the gear 46 is a similar spur gear 47 which is mounted on the lower end of the vertical shaft 48, also journaled in the main frame. The bevel gear 62 meshes with a similar gear 63 secured to one end of a horizontal shaft 64 which is journaled in the main frame and carries at its opposite end a cam 65 for operating the knife 20 (see Figs. 2, 6 and 8). This cam is adapted to operate transversely movable rods 68 and 69 which are pivoted at one end on a pin concentric with the axis of the cam and whose free ends are mounted in rectangular openings formed in uprights 70 of the main frame 71. Projections 66 and 67 are formed upon said rods 68 and 69 respectively and are pressed against the surface of the cam by a spiral spring 72 which is secured at its respective ends to flanges or projections 73 and 74 formed respectively upon the rods 68 and 69. The shape of the cam is such that during half of its rotation beginning for example, in the position of Fig. 8, it moves the rod 69 towards the right thereby placing the spring 72 under elastic stress and then holds the rod 69 in a stationary position for another half revolution at which time the abrupt shoulder of the cam allows the spring 72 to move the rod 69 towards the left with a rapid hammer blow of the flange 74 upon the end of the rod 76, one end of which is guided by the pins 78 carried by a cross member of the main frame 71 and the opposite end of which is pivoted on a pin 77 carried by the frame or support 21 of the knife 20, thereby causing the knife to move very rapidly and forcibly from right to left (see Fig. 8) until it occupies the position shown. During this time the cam has held the rod 68 in the position shown during half a revolution, at which time the shoulder of the cam passes the projection 66, and the rod 68 is moved forcibly to the right by the spring 72. This action causes the flange 72 to strike the end of the rod 75 which moves between another set of guide pins 78, also carried by the cross member of the frame 71 and which is pivoted upon the pin 77 similarly to the rod 76, thereby moving the support 21 and knife 20 rapidly and forcibly from the position of Fig. 8 towards the right. During this movement the appropriate pawl 23 engages the ratchet wheel 24, and turns the conveyer drum 17 a distance of one tooth. Upon the reverse stroke of the knife support, the other pawl 23 will move the drum 17 a distance of another tooth in the same direction. The mechanism is so timed that the strip 1 is fed such a distance beyond the cutting point as to form a came of the desired length.

The operation of the machine is briefly as follows: An endless traveling strip 1 of suitable cross section, is fed along the surface of the table 5, 5 and between the guide rollers 4, 4 indenting rolls 5, 5 9, 9 12, 12 and guide rollers 15, 15 until the forward end of the strip reaches the far end of the rotary conveyer 17; the knife 20 then moves rapidly so as to sever the traveling strip, and the movement of the conveyer then carries the cut length in a lateral direction. The end of the traveling strip then enters the succeeding groove 16 of the traveling conveyer 17 and when it reaches the far end thereof, the knife 20 moves in a reverse direction and severs a second length, the cut lengths being continuously transferred by the rotary conveyer to the fixed chute 26 through which they slide by gravity into the removable chute 27 until the same is filled. The attendant then removes the said chute 27 and places it upon the bottom of a receptacle 36 which is lined with waxed paper 37 (Fig. 5). A pair of vertical rods 38 are then introduced through the openings 39 formed in the chute 27 and openings 89 of the receptacle 37 into the floor 88. The operator then withdraws the removable chute by drawing the same in a direction transverse to the length of the cames and the rods 38 hold the cames and the sheet of paper 28 upon which they rest against withdrawal so that they remain within the receptacle 37. The removable chute is thus unloaded so as to be entirely empty and ready to receive a fresh sheet of paper 28. It is then applied to the fixed chute 26, the pintles 33 resting in the sockets 34. As soon as the chute is again filled it is placed in the receptacle 37 on top of the layer of cames previously deposited and is withdrawn in the manner previously described so as to leave a second layer of cames separated from the first layer by a sheet of waxed paper as shown. These operations are continued until the receptacle is entirely filled, when the rods 38 are withdrawn, the paper 37 folded over the cames and the receptacle closed by moving the side 90 and cover 92 on the hinges 91 and 93, the apertures 94 of the cover receiving the pins 95 and the hasp 97 having a slot 98 being closed upon the staple 99 and secured by a pin 100 (Fig. 8).

The cutting and delivering mechanism herein described, I have made the subject of a divisional application filed November 9th 1907, Serial No. 401,397. The packing mechanism set forth is claimed in my application filed April 8th, 1907, Serial No. 367,122.

Having now described my invention, what I claim as new and desire to secure by Letters Patent is as follows:

1. An apparatus for making cames comprising a bed for supporting the came strip, means for feeding said strip, rolls for forming indentations at the inside of the flanges of the strip, means for adjusting said rolls with reference to the bed to suit cames of different sizes, said means comprising an adjustable frame upon which the rolls are mounted, and an adjustable supporting roller adapted to coöperate with said rolls in forming the indentations, said roller being mounted on an auxiliary frame carried by the first named frame and adjustable therein.

2. In metal rolling apparatus, a bed for supporting the blank, a roll for forming the blank, means for adjusting said roll with reference to the bed to suit blanks of different sizes, said means comprising an adjustable frame upon which the roll is mounted, and an adjustable supporting roller adapted to coöperate with said roll in forming the blank, said roller being mounted on an auxiliary frame carried by the first named frame and adjustable therein.

3. An apparatus for making cames comprising a supporting bed, guides comprising rollers engaging the edges of the flanges of the came strip, supports for the rollers laterally adjustable upon said bed, means for feeding the came strip, said feeding means also producing indentations in the web of the strip, rolls for forming indentations at the inside of the flanges of the strip, means for adjusting said rolls with reference to the bed, and an adjustable supporting roller adapted to coöperate with said rolls.

4. In a machine of the class described, the combination of a main frame, an auxiliary frame vertically adjustable with respect to said main frame, and a third frame vertically adjustable with respect to said auxiliary frame, said last two frames supporting respectively an external support for the traveling strip and means for indenting the inner surfaces of the flanges thereof.

5. In a came making machine, a bed, laterally adjustable guide rollers for the came strip mounted upon said bed, a pair of fluted rolls mounted upon axes arranged perpendicular to said bed adapted to enter the channels in the came strip and indent the heart thereof, said rolls being positively driven whereby they form feeding means for the came strip, and means for indenting the inner faces of the flanges of the came strip comprising two sets of rolls, each set consisting of a supporting roll and a pair of toothed indenting rolls, coöperating therewith, said indenting rolls adapted to project into the channels upon each side of the heart of the came strip respectively, said sets of rolls being vertically adjustable with reference to the bed and the supporting and toothed rolls of each set being relatively vertically adjustable.

THOMAS W. MORRELL.

Witnesses:
SEWARD DAVIS,
OLIVER WILLIAMS.